(12) United States Patent
Li et al.

(10) Patent No.: US 10,739,174 B2
(45) Date of Patent: Aug. 11, 2020

(54) METHOD AND SYSTEM OF ACOUSTIC WAVE MEASUREMENT OF AXIAL VELOCITY DISTRIBUTION AND FLOW RATE

(71) Applicant: Yanqin Li, Zhengzhou (CN)

(72) Inventors: Yanqin Li, Zhengzhou (CN); Shuaijie Sun, Zhengzhou (CN)

(73) Assignee: Yanqin Li, Zhengzhou (CN)

(*) Notice: Subject to any disclaimer, the term of this patent is extended or adjusted under 35 U.S.C. 154(b) by 0 days.

(21) Appl. No.: 16/734,174

(22) Filed: Jan. 3, 2020

(65) Prior Publication Data
US 2020/0141776 A1    May 7, 2020

Related U.S. Application Data

(63) Continuation of application No. 16/603,166, filed as application No. PCT/CN2018/108837 on Sep. 29, 2018.

(51) Int. Cl.
*G01F 1/66* (2006.01)

(52) U.S. Cl.
CPC .............. *G01F 1/662* (2013.01); *G01F 1/667* (2013.01)

(58) Field of Classification Search
CPC . G01F 1/662; G01F 1/667; G01F 1/00; G01F 1/66; G01F 1/668; G01F 1/7082; G01F 23/2962
See application file for complete search history.

(56) References Cited

U.S. PATENT DOCUMENTS

| | | | |
|---|---|---|---|
| 2007/0220995 A1* | 9/2007 | Kishiro | G01F 1/662 73/861.28 |
| 2013/0047695 A1* | 2/2013 | Drachmann | G01F 1/662 73/1.16 |

(Continued)

FOREIGN PATENT DOCUMENTS

| | | |
|---|---|---|
| CN | 102072966 A | 5/2011 |
| CN | 102174887 A | 9/2011 |

(Continued)

OTHER PUBLICATIONS

Yanqin Li et al. "Acoustic reconstruction fo the velocity field in a furnace using a characteristic flow model", J Acoustical Society of America 131, 4399 (2012).*

(Continued)

*Primary Examiner* — Catherine T. Rastovski
(74) *Attorney, Agent, or Firm* — Kolitch Romano LLP

(57) ABSTRACT

A method is provided to measure a distribution of axial velocities and a flowrate in a pipe or a vessel. The method comprises selecting a single cross-section at a stable-flow segment in a pipe or a vessel, installing a plurality of acoustic wave sensors along a peripheral wall of the pipe or the vessel to form a plurality of effective sound wave paths; measuring sound wave travelling time on each sound wave path; substituting the measured sound wave travelling time into the model formula based on a sound path refraction principle for reconstruction calculation to obtain a distribution of axial velocity in the measured cross-section of the pipe or the vessel, u(x,y); and integrating the distribution of the axial velocity u(x,y) along the cross-section to obtain a flow rate. A system is also provided to measure an axial velocity distribution and a flow rate in a pipe or a vessel.

11 Claims, 9 Drawing Sheets

(56) References Cited

U.S. PATENT DOCUMENTS

2015/0279072 A1* 10/2015 Black .................. G01F 1/667
                                                      382/109
2019/0234781 A1* 8/2019 Mess .................. G01F 1/662

FOREIGN PATENT DOCUMENTS

| CN | 103336145 A | 10/2013 |
|---|---|---|
| CN | 106537098 A | 3/2017 |
| CN | 107607158 A | 1/2018 |
| JP | 3649028 B2 | 5/2005 |

OTHER PUBLICATIONS

Weber, "Ultrasonic Beam Propagation in Turbulent Flow,", Worcester Polytechnic Inst., Thesis, 2004.*
Rokhana, Rika, "Using Array of 8 Ultrasonic Transducers on Accoustic Tomography for Image Reconstruction," 2015 International Electronics Symposium (IES), Dec. 31, 2015.
Apr. 28, 2019, International Search Report and Written Opinion from the China National Intellectual Property Administration in PCT/CN2018/108837, to which this application claims priority.

* cited by examiner

100

```
┌─────────────────────────────────────────────────────────────┐
│ SELECTING A SINGLE CROSS-SECTION LOCATED AT A STABLE-FLOW    │──102
│ SEGMENT IN A PIPE OR A VESSEL                                │
└─────────────────────────────────────────────────────────────┘
                              ▼
┌─────────────────────────────────────────────────────────────┐
│ INSTALLING A PLURALITY OF ACOUSTIC WAVE SENSORS ALONG A      │
│ PERIPHERAL WALL OF THE CROSS-SECTION, WHEREIN A PLURALITY    │──104
│ OF SOUND WAVE PATHS ARE FORMED BETWEEN THE PLURALITY OF      │
│ ACOUSTIC WAVE SENSORS                                        │
└─────────────────────────────────────────────────────────────┘
                              ▼
┌─────────────────────────────────────────────────────────────┐
│ MEASURING A SOUND WAVE TRAVELING TIME ALONG EACH SOUND WAVE  │──106
│ PATH BY THE PLURALITY OF ACOUSTIC SENSORS                    │
└─────────────────────────────────────────────────────────────┘
                              ▼
┌─────────────────────────────────────────────────────────────┐
│ SUBSTITUTING THE MEASURED SOUND WAVE TRAVELING TIMES INTO AN │
│ EQUATION TO RECONSTRUCT THE DISTRIBUTION OF THE AXIAL        │──108
│ VELOCITY ON THE CROSS SECTION OF THE PIPE OR THE VESSEL TO   │
│ OBTAIN AXIAL VELOCITY DISTRIBUTION                           │
└─────────────────────────────────────────────────────────────┘
                              ▼
┌─────────────────────────────────────────────────────────────┐
│ INTEGRATING THE RECONSTRUCTED AXIAL VELOCITY DISTRIBUTION    │
│ U(X,Y) ALONG THE CROSS-SECTION TO OBTAIN A FLOW RATE IN THE  │──110
│ PIPE OR THE VESSEL                                           │
└─────────────────────────────────────────────────────────────┘
```

FIG. 2

| TABLE 1: SOUND WAVE TRAVELING TIME (ms) ALONG EACH PATH AT A CROSS SECTION IN THE SIMULATED PIPE ILLUSTRATED IN FIG. 4 | | | | | | | |
|---|---|---|---|---|---|---|---|
| PATH | AB | CB | DC | ED | EF | FA | EA | AC |
| TIME | 1.456953 | 1.456978 | 1.456953 | 1.456953 | 1.456978 | 1.456953 | 2.523436 | 2.523436 |
| PATH | EC | FB | DB | FD | DA | EB | FC | |
| TIME | 2.523593 | 2.523593 | 2.523436 | 2.523436 | 2.914016 | 2.91395 | 2.91395 | |

FIG. 13

| TABLE 2: SOUND WAVE TRAVELING TIME (ms) ALONG EACH PATH AT A CROSS SECTION IN THE SIMULATED PIPE ILLUSTRATED IN FIG. 7 | | | | | | | |
|---|---|---|---|---|---|---|---|
| PATH | AB | CB | DC | ED | EF | FA | EA | AC |
| TIME | 1.456937 | 1.456978 | 1.456972 | 1.45695 | 1.456937 | 1.456923 | 2.523421 | 2.523432 |
| PATH | EC | FB | DB | FD | DA | EB | FC | |
| TIME | 2.523598 | 2.523542 | 2.52344 | 2.523428 | 2.913999 | 2.913926 | 2.913928 | |

FIG. 14

METHOD AND SYSTEM OF ACOUSTIC WAVE MEASUREMENT OF AXIAL VELOCITY DISTRIBUTION AND FLOW RATE

CROSS-REFERENCES

This application is a continuation of U.S. patent application Ser. No. 16/603,166 filed Oct. 4, 2019, which is a PCT National Phase entry of PCT/CN2018/108837, filed Sep. 29, 2018, which claims priority to Chinese Patent Application Serial No. 201810910508.3 filed Aug. 11, 2018, all of which are incorporated herein by reference into the present disclosure.

FIELD

The present disclosure relates to the measurement on fluid flow. More specifically, the present disclosure relates to a method and system of acoustic measurement of an axial velocity distribution and a flow rate in a pipe or in a vessel.

INTRODUCTION

The axial velocity distribution and the flow rate in pipes and vessels are important technical parameters in the industrial or research applications. Generally, the axial velocity distribution along a cross-section is nonuniform. An effective measurement method is needed. The acoustic wave method is a suitable and advanced measurement method.

A conventional acoustic wave measurement of the axial velocity distribution in a pipe is based on the principle that the traveling time of a sound wave is influenced by the direct superposition of sound speed with a component of fluid flow velocity in the direction parallel to the sound traveling. The method has to install a certain number of acoustic wave sensors on two separate cross-sections along the axis of the pipe. The information obtained by this method is an average axial velocity distribution between the two cross-sections. The conventional method has the following drawbacks: the needs for quite many acoustic wave sensors, complicated system, stringent requirement on the pipe measuring conditions in the pipe, and influence on the measurement accuracy and precision to some extents by the sound path curvature caused by the axial velocity.

SUMMARY

The objective of this invention is to overcome the drawbacks of the present technologies, and provide a method and system of acoustic wave measurement of the axial velocity distribution in a pipe and in a vessel.

In order to achieve the above objectives, the technical solution of this invention is to provide an acoustic method to measure an axial velocity distribution and the flow rate in a pipe. The method comprises:

selecting a single cross-section at a flow stable segment or an interested segment in the pipe or the vessel, and installing a plurality of acoustic wave sensors along a peripheral wall of the pipe or the vessel at the cross-section, wherein a plurality of effective sound wave paths are formed between the plurality of acoustic wave sensors, wherein two sound wave projections in the mutual directions between one pair of acoustic wave sensors corresponds to only one effective sound wave path;

measuring a sound wave travelling time on each sound wave path, respectively; and taking the average of two mutually sound travelling times on each path as the effective sound travelling time on the sound wave path;

substituting the sound wave travelling times on all sound wave paths into the follow formula, so that the axial velocity distribution u(x,y) can be obtained via reconstruction;

$$\int_{l_i} u(x,y)\sqrt{1+(y')^2}\,dx = L_i\sqrt{c^2 - \left(\frac{L_i}{\Delta t_i}\right)^2}, \quad i=1,2,\cdots,N$$

where, $l_i$ is the ith sound wave path, $L_i$ is a distance between the two acoustic sensors at the two ends of the ith path, $\Delta t_i$ is the sound wave traveling time along the ith effective sound wave path, N is the number of effective sound wave paths, c is the static sound speed at the measuring physical conditions of the medium in the pipe or the vessel.

In some embodiments, the method further comprises integrating the axial velocity u(x,y) obtained from above step along the cross-section to obtain the flow rate in the pipe.

In some embodiments, the method includes measuring two traveling times of sound waves between two acoustic wave sensors in opposite directions, respectively, and the average of these two traveling times is the travelling time of sound wave on this effective sound wave path.

In some embodiments, each acoustic wave sensor emits sound waves in turn. When one acoustic wave sensor emits sound wave, the rest of the acoustic wave sensors record the sound wave and the sound frequency of all acoustic wave sensors is the same.

In some embodiments, each two to three acoustic wave sensors emit sound waves simultaneously, wherein each acoustic wave sensor has different transmitting frequencies, and the frequencies are identifiable by wave filtering.

In some embodiments, the acoustic wave sensor has the function of both emitting and receiving sound waves.

In some embodiments, the acoustic wave sensor is a combination of a sound wave transmitter and a sound wave receiver.

In some embodiments, the axial velocity distribution u(x,y) is calculated by fitted with Taylor series expansion.

In some embodiments, when the axial velocity distribution u(x,y) accords with characteristics of a free jet flow, the axial velocity distribution u(x,y) is calculated with approximate fitting using Gaussian function:

$$u(x,y) = Ue^{-\frac{(x-x_0)^2+(y-y_0)^2}{2\sigma^2}} + u_0,$$

where $(x_0,y_0)$ is the coordinates of the point of maximum velocity, U is the maximum velocity of the jet with the Gaussian distribution, $u_0$ is the base velocity at the far edge of the jet, and $\sigma$ is the expansion width.

In some embodiments, the selected cross-section intersects the axis of the pipe or vessel in a right-angle or an approximate right-angle.

According to another aspect, this invention provides a system on acoustic measurement of an axial velocity distribution and a flow rate in a pipe or a vessel. The system includes a plurality of acoustic wave sensors installed on a peripheral wall of a cross-section in the pipe or the vessel; a digital to analog converter card, an analog to digital converter card, and a measuring computer for measurement.

The measurement software to implement the above described acoustic measuring method was installed in the measuring computer to determine the axial velocity distribution and the flow rate;

The digital to analog converter card is connected with the measuring computer and the acoustic wave sensors, respectively, to transfer the frequency digital signals coded with the measurement software into analogue acoustic signals and the sound wave is emitted by the acoustic wave sensors.

The analog to digital converter card is connected with the measuring computer and the acoustic wave sensors, respectively, to transfer the collected acoustic signals in the pipe or the vessel into digital signals and input into the measuring computer.

The measuring computer, via the measurement software, controls the acoustic sound wave sensors to emit sound waves, measures the sound traveling time on an effective sound wave path from each acoustic wave sensor to other acoustic wave sensors, and substitutes the effective sound traveling times on each effective sound wave path into the following reconstruction formula for axial velocity distribution on cross sections in a pipe or a vessel to obtain u(x, y):

$$\int_{l_i} u(x, y)\sqrt{1 + (y')^2}\, dx = L_i \sqrt{c^2 - \left(\frac{L_i}{\Delta t_i}\right)^2}, \quad i = 1, 2, \cdots, N$$

wherein, is the ith sound path, $L_i$ is a distance between the two acoustic wave sensors at the two ends of the ith path, $\Delta t_i$ is the traveling times of the sound waves along the ith sound wave path, N is the number of effective sound wave paths, c is the static sound speed at the measuring physical conditions of the medium;

In some embodiments, the measuring computer, via the measuring software, integrates the obtained axial velocity distribution u(x,y) along the cross-section, so that the flow rate in the pipe or the vessel is obtained.

The methods and systems of the present disclosure have various advantages. For example, the methods and systems of the present disclosure determine the axial velocity distribution and the flowrate using the data of the sound wave traveling times between the acoustic wave sensors at a single measurement cross-section and reconstructing axial velocity distribution in the pipe or vessel based on a sound wave path curvature theory. Compared to the conventional acoustic measurement methods, the methods and systems of the present disclosure need half of the number of acoustic wave sensors for similar measurement precision, have advantages of smaller errors, higher precision, and higher reliability. Further, the accuracy of this invention is not affected by the following factors: whether the measured cross-section is exactly perpendicular to the axis of the pipe or the vessel, whether the acoustic wave sensors are evenly installed on the peripheral of the pipe or the vessel at the measured cross-section, whether the reconstruction formulas on the axial velocity distribution are varied in form, etc. That is, appropriate variations of the form of the reconstruction formula/equation for the axial velocity distribution do not affect the scope of the protection of this invention.

The method disclosed by this invention can be used to effectively measure and determine an axial velocity distribution and a flow rate in a pipe containing gas, liquid, and two-phase or multi-phase flow in a pipe. It can also be used to measure an axial flow field in a combustion chamber, a jet flow, a fluidized bed, a chemical reactor, and a jet flow in open space.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 2 is a flowchart of a method to determine an axial velocity distribution and a flow rate in a pipe or a vessel according to one embodiment of the present disclosure.

FIG. 13 is a table listing sound wave travelling time on each sound wave path between six acoustic sensors obtained via integration of an axial velocity distribution of a preset simulation field along the sound wave paths, in which a center of the fluid flow field is at a geometrical center of a round cross section of a pipe and six acoustic sensors are used.

FIG. 14 is a table listing sound wave travelling time on each sound wave path between six acoustic sensors obtained via integration of an axial velocity distribution of a preset simulation field along the sound wave paths, in which a center of the fluid flow field is deviated from a geometrical center of a round cross section of a pipe and six acoustic sensors are used.

DETAILED DESCRIPTION

Various aspects and examples of a method and system of an acoustic measurement of an axial velocity distribution and a flow rate in a pipe or in a vessel are described below and illustrated in the associated drawings. Unless otherwise specified, a method and system of an acoustic measurement of an axial velocity distribution and a flow rate in a pipe or in a vessel in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Figure 1:
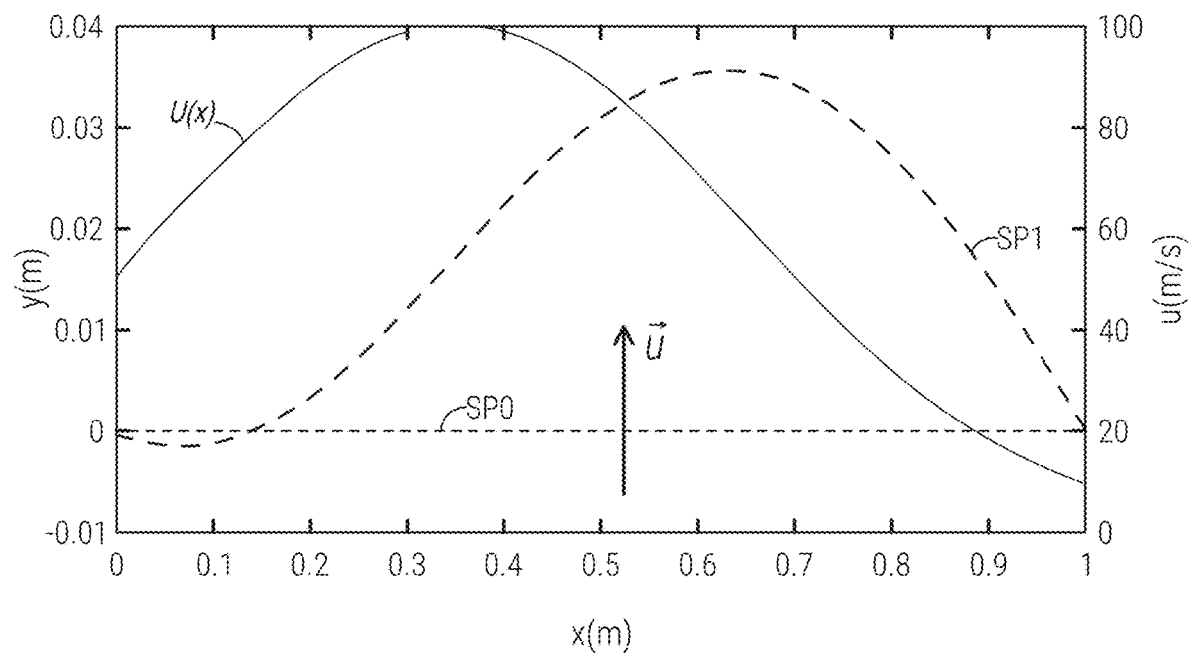
FIG. 1 is a schematic diagram of an axial velocity distribution along one dimension x direction, and a sound wave path, illustrating an effect of a fluid velocity on the sound wave path.

FIG. 1 is a schematic diagram of an axial velocity distribution along one dimension x direction, and a sound wave path, illustrating an effect of a fluid velocity on the sound wave path. In FIG. 1, the sound wave path is schematically illustrated as a straight line SP0 in the absence of a fluid flow (a gas flow or a liquid flow) on the sound wave path. When a flow with a velocity U(x) (noted as Ux) is present at one dimension X which is in the path of the sound wave, the sound wave path is bent or refracted to become a curve and the bent sound wave path is illustrated as SP1. The extent of the refraction/bending correlates with the direction and magnitude of the flow intersecting the sound wave path. As the length of the bent sound wave path changes, the sound wave traveling time between two points on the sound wave path changes. In other words, the sound wave travelling time in a sound wave path varies as the flow or velocity of fluid on the sound propagation path varies. Thus, when the sound wave travelling time on the different sound wave paths in a pipe or a vessel is known, the velocity and flowrate of the fluid in the pipe or the vessel can be determined according to the correlation between the sound wave path and the velocity or flow.

Figure 3:
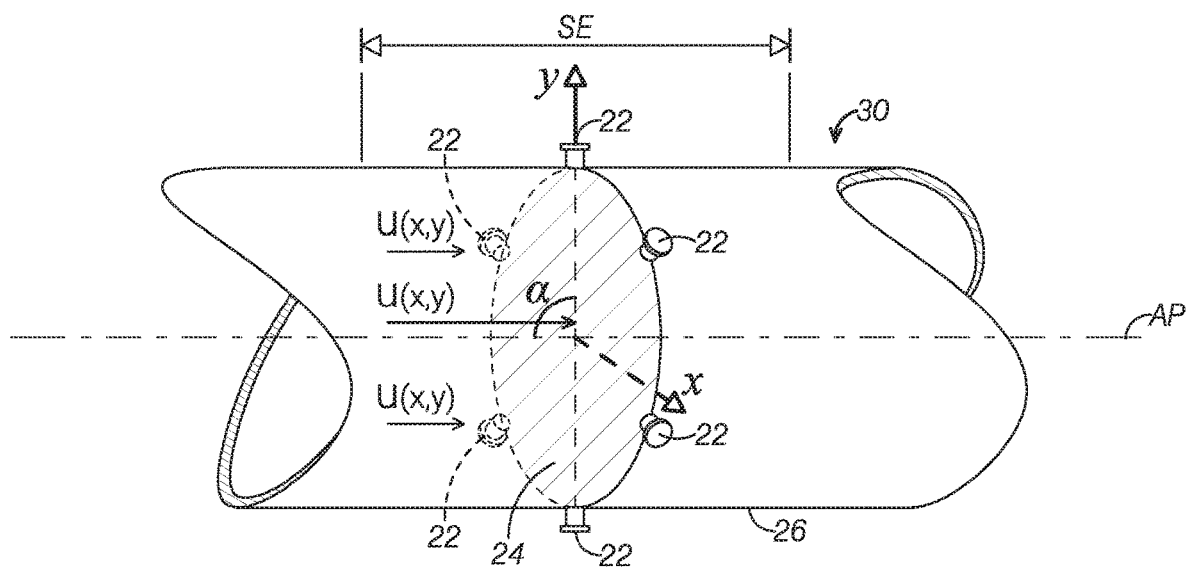
FIG. 3 is a perspective partial view of a pipe, illustrating positioning of acoustic sensors at a cross section of the pipe according to one embodiment of the present disclosure.
Figure 12:
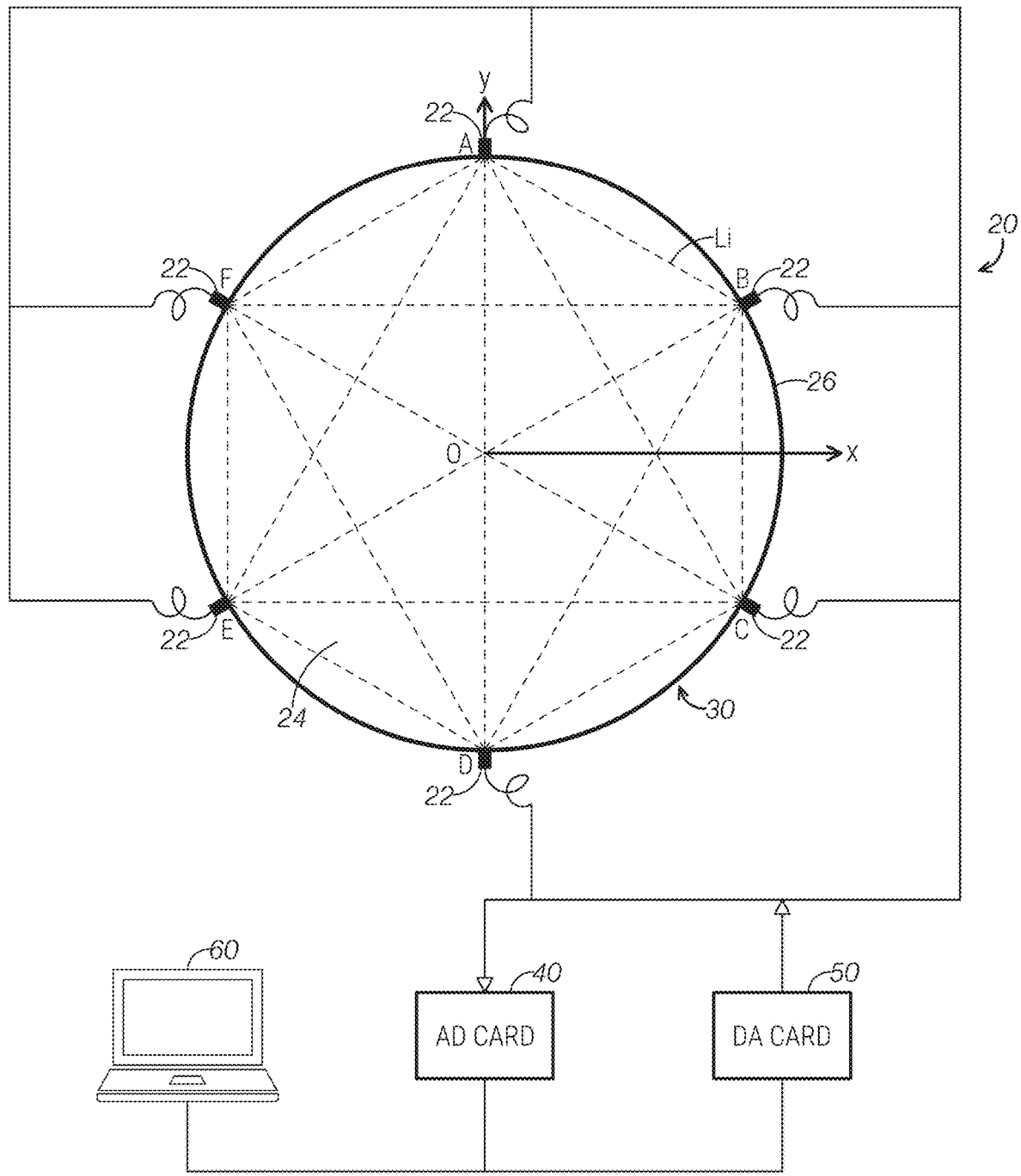
FIG. 12 is a system to measure an axial velocity distribution and a flow rate in a pipe or a vessel according to one embodiment of the present disclosure.

FIG. 2 is a method 100 to determine an axial velocity distribution and a flow rate in a pipe or a vessel according to one embodiment of the present disclosure. The method 100 is further illustrated by an example as shown in FIG. 3 and FIG. 12, in which an axial velocity distribution and a flowrate in a pipe is determined. FIG. 3 is a perspective partial view of a pipe 30, illustrating positioning of acoustic wave sensors 22 at a cross section 24 of the pipe 30 according to one embodiment of the present disclosure. A cross section of a pipe or a vessel illustrating the example positioning of the acoustic wave sensors is also illustrated in FIG. 12, in which a system to measure an axial velocity distribution and a flow rate in a pipe or a vessel is shown. Referring FIG. 2 and with further reference to FIG. 3 and FIG. 12, the method 100 selecting a single cross-section 24 at a flow-stable segment SE or a segment of interest in a pipe or a vessel at 102 and installing a plurality of acoustic wave sensors on a peripheral wall 26 of the pipe 30 at the cross-section 24 at 104. The plurality of sound wave paths are formed between the plurality of acoustic sensors 11. The number of the acoustic wave sensors 22 may be determined according to the complicity of the flow field. In some embodiments, four, five, six, seven or eight acoustic wave sensors are installed or disposed on the peripheral wall 26 at the selected cross section 24 of the pipe 30. In one embodiment, acoustic wave sensor 22 may be a unitary sensor integrating with both functions of acoustic signal emission and reception. In another embodiment, the acoustic wave sensor 22 may be a combination of an acoustic signal emitter and an acoustic signal receiver.

At 106, the method 100 may include measuring a sound wave traveling time on all sound wave paths. Referring to FIG. 12, a plurality of effective sound wave paths are formed between the plurality of acoustic wave sensors 22. In some embodiments, the mutually propagated sound wave paths between a pair of acoustic wave sensor are only counted as one effective sound wave path. Correspondingly, the method 100 includes measuring two sound wave traveling times on each sound wave path in opposite directions of the two acoustic wave sensors 22. In one example, the sensor 22 at the point A measuring the sound wave traveling time from the point D to point A and the sensor 22 at the point D measuring the sound wave traveling time from the point A to the point D. The average sound traveling time of the two sound wave traveling times between two points (e.g., A to D and D to A) wherein the two acoustic sensors are disposed is used as a sound wave traveling time of an effective sound wave path.

At 108, the method 100 may include substituting the effective sound wave traveling time on each sound wave path into a reconstruction formula to reconstruct an axial velocity distribution to obtain the axial velocity distribution u(x,y). In some embodiments, the following formula (1) is used as a reconstruction formula of an axial velocity distribution:

$$\int_{l_i} u(x, y)\sqrt{1 + (y')^2}\, dx = L_i \sqrt{c^2 - \left(\frac{L_i}{\Delta t_i}\right)^2},\ i = 1, 2, \cdots, N \quad (1)$$

where, $I_i$ is an ith sound wave path, y' is dy/dx, $L_i$ is a distance between the two acoustic wave sensors at the ith effective sound wave path, $\Delta t_i$ is the sound wave traveling time along the ith sound wave path, N is the number of effective sound wave paths, c is the sound traveling speed in a static medium in the pipe or the vessel at the measuring physical conditions.

At 110, the method 100 may further include integrating the reconstructed axial velocity u(x,y) over the cross-section 24 to determine the flow rate in the pipe 30, for example. In some embodiments, every acoustic wave sensor 22 emits sound wave in turn, and the sound frequency of the acoustic signal from each acoustic wave sensor 22 is the same. When one acoustic wave sensor 22 emits a sound wave, the rest of other acoustic wave sensors record this sound wave. Typically, the acoustic measurement by the acoustic wave sensor 22 takes approximately 2 seconds to complete. Since the flow field is relatively steady, the effect of such sound emitting method on the measurement precision is very small.

In some embodiments, every two to three acoustic wave sensors 22 emit sound waves simultaneously, and each acoustic wave sensor 22 emits sound wave at different frequencies. For example, referring to FIG. 12, the acoustic wave sensors 22 at the points A, B and C emit the sound waves simultaneously first and then the acoustic wave sensors 22 at the points D, E and F emit the sound waves simultaneously. It should be appreciated that any of the acoustic wave sensors may be formed as a group to emit sound wave simultaneously. Compared with the method that every acoustic wave sensor 22 emits sound wave in turn, this approach takes shorter time to finish one complete measurement on the axial velocity distribution in the pipe or the vessel. However, using different frequencies simultaneously in one measurement may have difficulty for effective identification of acoustic signals from each other.

In practical application, whether to control the acoustic wave sensor to emit the sound wave in turn or control every 2-3 acoustic wave sensors to emit sound wave simultaneously can be determined according to the time required to complete the measurement.

It should be noted that the suitable measurement sound acoustic frequency can be selected based on the size of the measured object and the properties of the flow medium. For gas or multiphase medium, the attenuation rate of sound wave is proportional to the square of the frequency, hence the sound wave would attenuate quickly with increase of the sound wave frequency. However, the larger the frequency is, the more favorable the condition to achieve high precision of obtaining the sound wave travelling time, and thus high precision of measurement results of the axial velocity distribution. A high measurement sound frequency should be used as long as the sufficient intensity of acoustic signals at the ends of the sound paths can be achieved so as to ensure the measurement accuracy.

In order to diminish the influence of the radial component of the flow velocity within the measured cross-section in the pipe, the average of the two sound wave travelling times along each effective sound wave path in opposite directions may be taken as the sound wave traveling time in the reconstruction.

In some embodiments, 4, 5, 6, 7, or 8 acoustic wave sensors may be evenly installed around the measured cross-section to form six (6), ten (10), fifteen (15), twenty one (21), and twenty eight (28) sound wave effective paths, respectively. In the example illustrated in FIG. 12, the six (6) acoustic sensors 22 are disposed on the peripheral wall at the cross section, which forms 15 sound wave paths, i.e., the total of fifteen (15) sound paths between points A and B, C and B, D and C, E and D, E and F, F and A, E and A, A and C, E and C, F and B, D and B, F and D, D and A, E and B and F and C, respectively.

In some embodiments, the axial velocity distribution $u(x,y)$ is fitted with Taylor series expansion for reconstruction. The $3^{rd}$ order Taylor series expansion below may be used for reconstruction, for example, $$u(x,y)=C_1+C_2x+C_3y+C_4x^2+C_5xy+C_6y^2+C_7x^3+C_8x^2y+C_9xy^2+C_{10}y^3+o(x,y) \quad (2)$$

where $o(x,y)$ is the infinitely small quantity term, $C_1$, $C_2$, . . . , $C_{10}$ are the polynomial coefficients to be determined. The precision of the fitting polynomial, and correspondingly the number of the terms, is determined by the complexity of the axial flow field. Correspondingly, the number of effective sound wave paths formed by the acoustic wave sensors should be no less than the number of the fitting polynomial coefficients.

In some embodiments, if the axial velocity distribution $u(x,y)$ accords with characteristics of a free jet flow, a Gaussian polynomial below may be used for reconstruction:

$$u(x, y) = Ue^{-\frac{(x-x_0)^2+(y-y_0)^2}{2\sigma^2}} + u_0 \quad (3)$$

where $(x_0,y_0)$ is the coordinates of the point of maximum velocity, U is the maximum velocity magnitude of the jet flow with the Gaussian distribution, $u_0$ is the base velocity at the far edge of the jet away from the center of the jet flow, and a is the expansion width (corresponding to the standard deviation of the Gaussian function). In this scenario, the number of effective sound wave paths determined by the corresponding number of acoustic wave sensors should be no less than five (5) such that ten (10) propagation sound wave paths are formed between each pair of the acoustic wave sensors.

In some embodiments, the cross-section 24 in a pipe 30 or a vessel intersects an axis AP of a pipe or a vessel with an angle α (as shown in the example of the pipe 30 in FIG. 3). Referring to FIG. 3 and FIG. 12, the selected cross-section 24 may be perpendicular or substantially perpendicular to the axis AP of the pipe 30 or the vessel, that is the angle α is substantially 90 degrees. In some embodiments, the angle α may be greater or less than 90 degrees. In some embodiments, the acoustic wave sensors 22 may be installed around the cross section 24 of the peripheral wall 26 evenly. In some embodiments, the acoustic wave sensors may be installed unevenly around the peripheral wall of the measured cross-section according to the characteristics of the axial flow profile such that more sound wave paths are obtained for the flow field with relatively complex variations of axial velocity.

It should be appreciated that the shape of the cross-section of the measured object, as well as certain variations of the reconstruction formulas for the axial velocity distribution would not influence the effect of the measurement method and system of the present disclosure.

The measurement methods of the present disclosure are suitable for the pipes and vessels with different cross-section shapes such as circular, elliptical, and rectangular etc. Therefore, reconstructing the axial velocity distribution for a circular cross-sectional pipe is used as an example to validate the acoustic measurement method of this invention.

As shown in FIG. 3 and FIG. 12, a cross-section 24 within a stable-flow segment in a circular cross-sectional pipe is selected, and six (6) acoustic wave sensors 22 are disposed around a peripheral wall 26 of the pipe 30 at the measured cross-section 24 of the pipe, Other conditions include: the diameter of the pipe is one (1) meter, the medium is air, and the temperature is room temperature. The preset axial velocity distribution is reconstructed by the method of this invention using a simulated acoustic measurement.

Taking the geometric center of the cross-section of the pipe as the coordinate origin, the preset simulation axial velocity field of the round cross section in the pipe with a center of the flow field at the geometric center is constructed as follows:

$$u_0(x,y)=5e^{-(x^2+y^2)} \quad (4)$$

Figure 4:
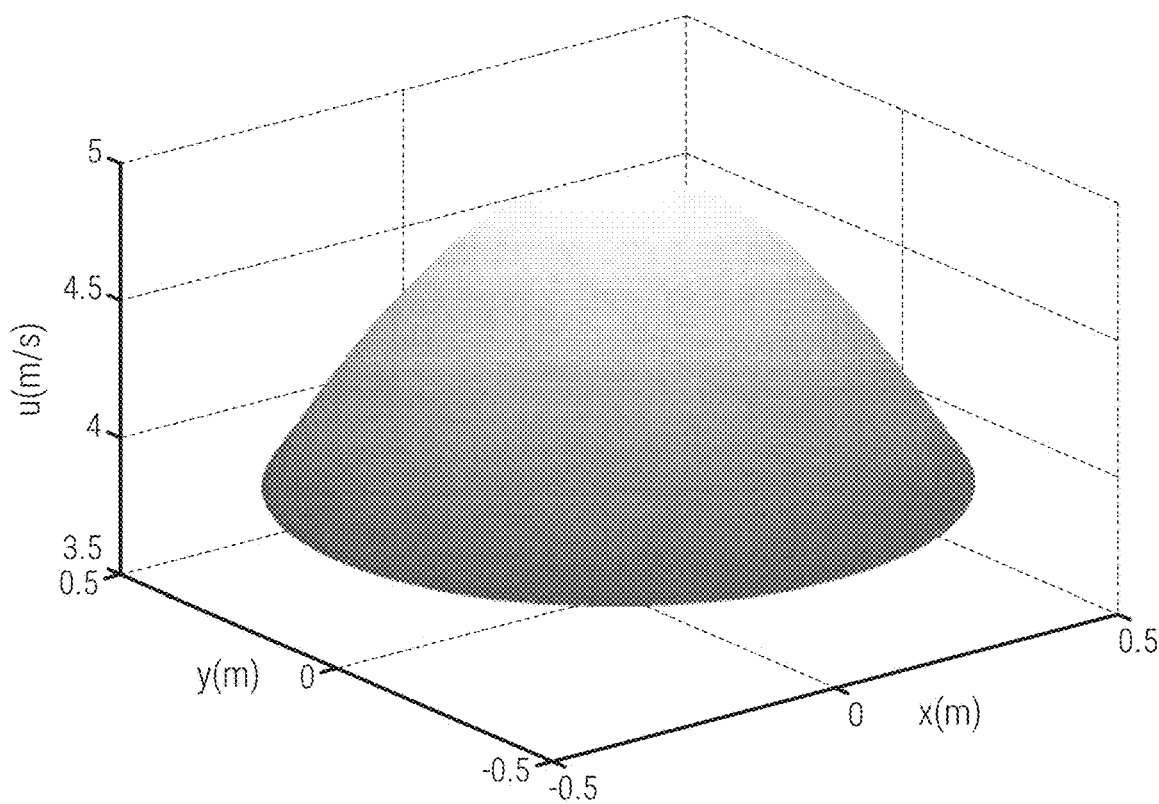
FIG. 4 is an axial velocity distribution of a preset simulation flow field in a round cross-section pipe, in which the flow field center resides at the geometric center of the pipe.

$u_0$ (x, y) is illustrated in a coordinate system as shown in FIG. 4.

Substituting formula (4) into formula (1) and integrating along sound wave paths as shown in FIG. 12, all sound wave travelling times on the sound wave paths are obtained. The sound wave paths shown in FIG. 12 and corresponding sound travelling times (ms) in the simulated pipe are listed in Table 1 in FIG. 13, wherein 6 digits after decimal point are kept.

Figure 5:
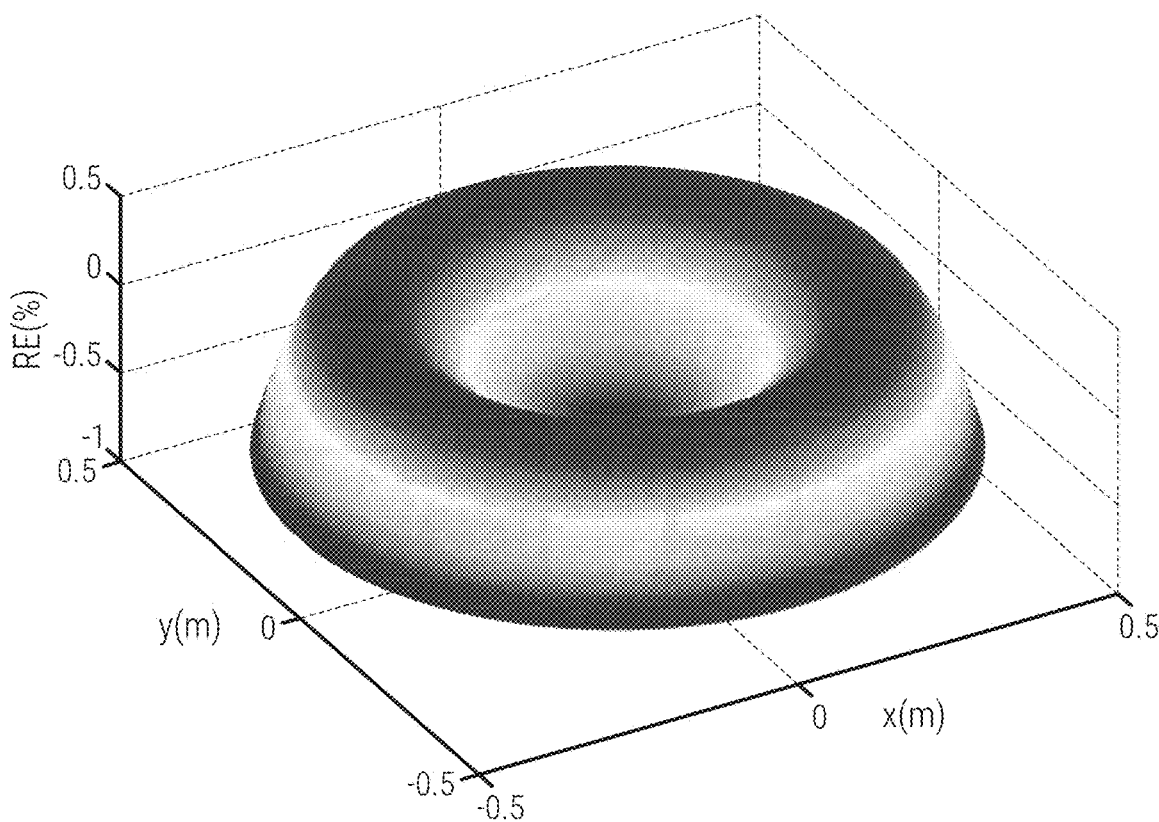
FIG. 5 shows the reconstruction relative errors of an axial velocity distribution in a flow field having a center at a geometric round center, using six of acoustic wave sensors to simulate measurement in a round cross section pipe with 3 order fitting precision by Taylor series expansion.

Based on the acoustic method 100 to determine the axial velocity distribution and flow rate, and by using a 3 order precision fitting by Taylor series expansion to calculate the axial velocity distribution u(x,y) and the reconstruction formula (1), the results of reconstructed flow field u(x,y) with the acoustic simulation measurement is obtained. The relative reconstruction errors of u(x,y) using the method 100 to the preset simulation axial velocity field are shown in FIG. 5. FIG. 5 shows the reconstruction relative errors of an axial velocity distribution in a flow field having a center at a geometric round center, using six of acoustic wave sensors to simulate measurement in a round cross section pipe with 3 order fitting precision by Taylor series expansion. As can be seen in FIG. 5, the relative error of the reconstructed u(x,y) using the method 100 to the preset simulation axial velocity field is approximately within a range of −0.5463 to 0.2872.

Figure 6:
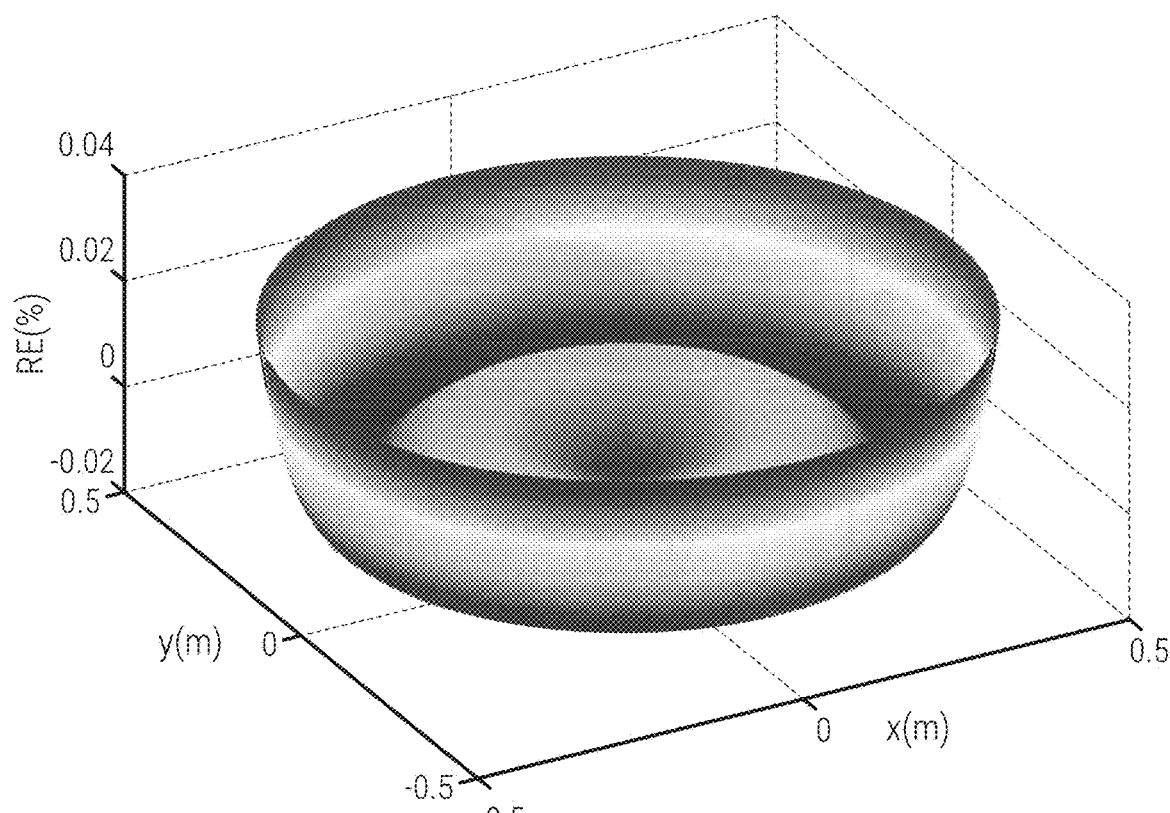
FIG. 6 shows the reconstruction relative errors of an axial velocity distribution in a flow field having a center at the geometric round center, using six of acoustic wave sensors to simulate measurement in a round cross section pipe with 4 order fitting precision by Taylor series expansion.

Similarly, the reconstructed axial velocity distribution u(x,y) with a 4 order precision Taylor series expansion is conducted, and the relative reconstruction error is shown in FIG. 6. As can be seen in FIG. 6, the relative error of the reconstructed u(x,y) using the method 100 to the preset simulation axial velocity field is approximately in a range of −0.0088 to 0.0025.

As can be seen, the simulated acoustic measurement is sufficiently accurate and reliable. And when the fitting precision with Taylor series expansion is increased, the simulated measurement precision is also increased correspondingly.

Similarly, in another example, a preset simulation field may be built with the flow center deviating from the geometric center in a round cross section of a pipe, and a center of the round cross section is used as an origin of a coordinate. The preset axial velocity distribution in the pipe is determined using the following formula:

$$u_0(x,y)=5e^{-(1.5(x-0.1)^2+(y+0.15)^2)} \quad (5)$$

Figure 7:
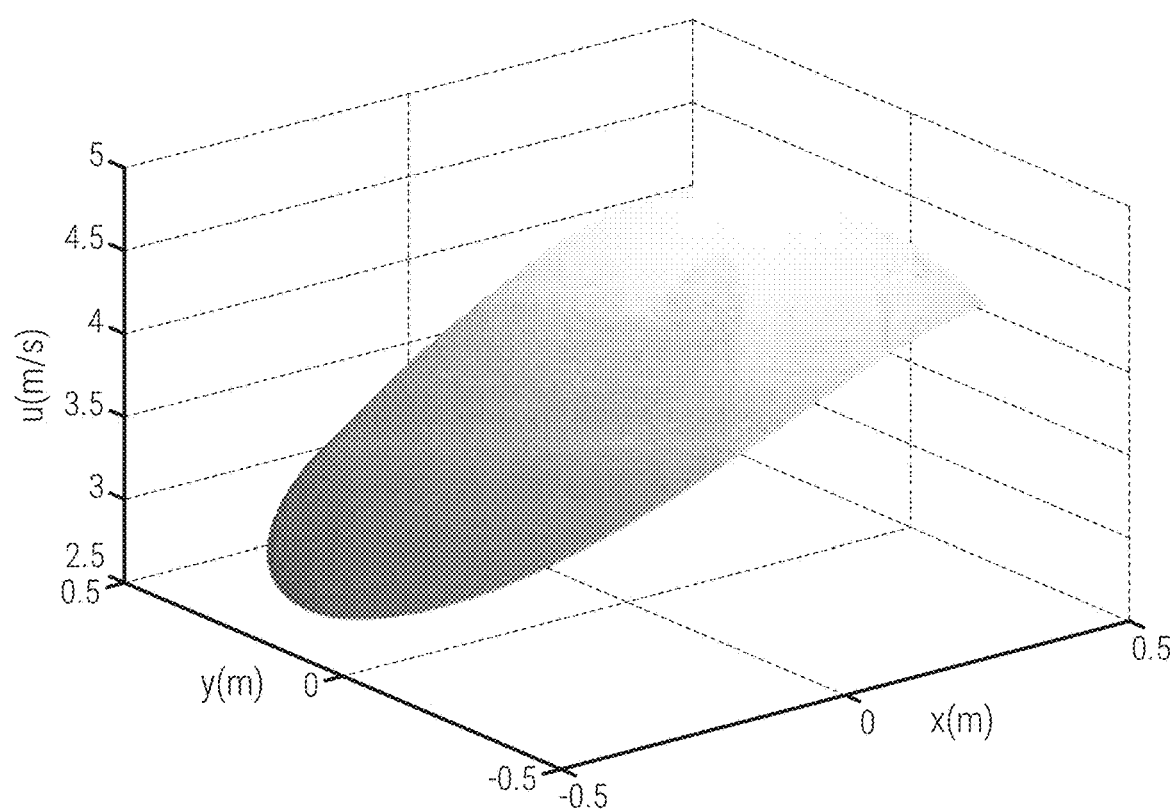
FIG. 7 is an axial velocity distribution of a preset simulation flow field in a round cross-section pipe, which flow center deviated from the geometric center of the pipe.

The preset simulation field of the formula (5) is illustrated in FIG. 7.

By substituting formula (5) into formula (1) and integrating along sound wave paths shown in FIG. 12, all sound wave travelling times (ms) are obtained and listed in Table 2 in FIG. 14, wherein 6 digits are remained behind a decimal point.

Figure 8:
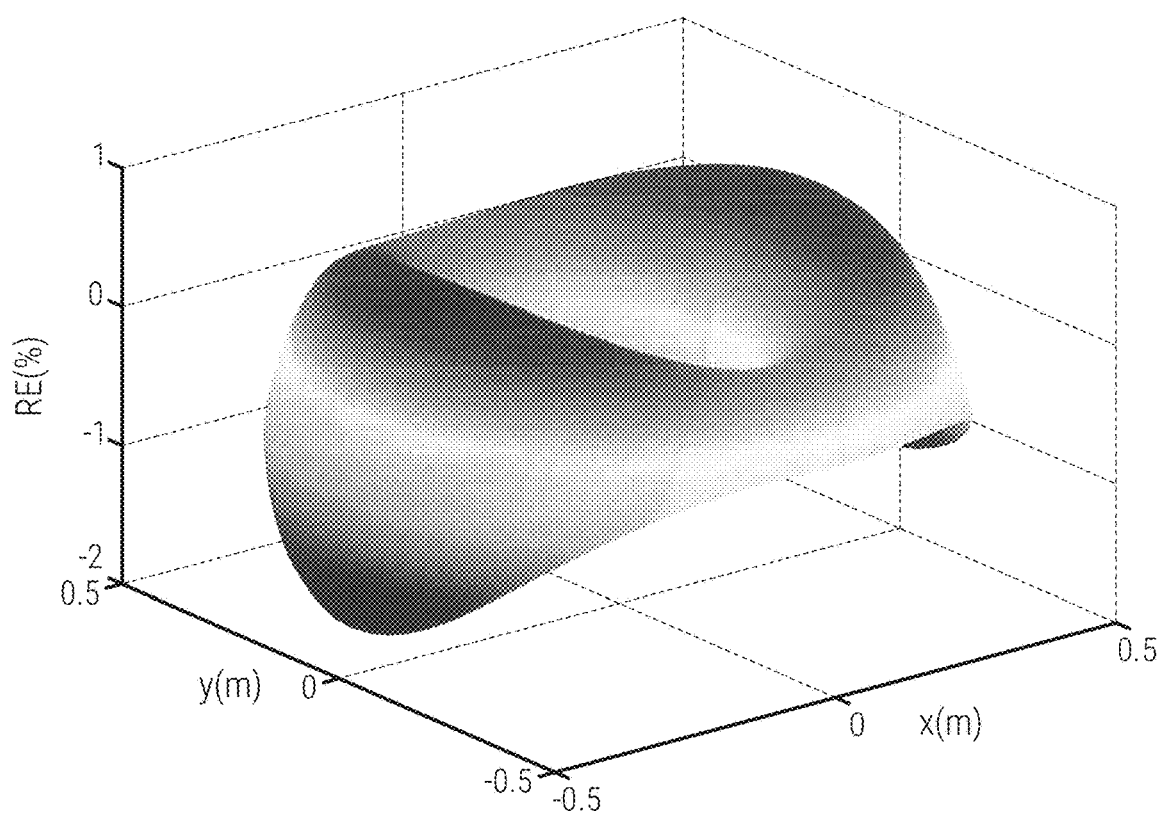
FIG. 8 shows the reconstruction relative errors of an axial velocity distribution in a flow field having a center deviated from a geometric round center, using 6 of acoustic wave sensors to simulate measurement in a round-cross section pipe with 3 order fitting precision by Taylor series expansion.
Figure 9:
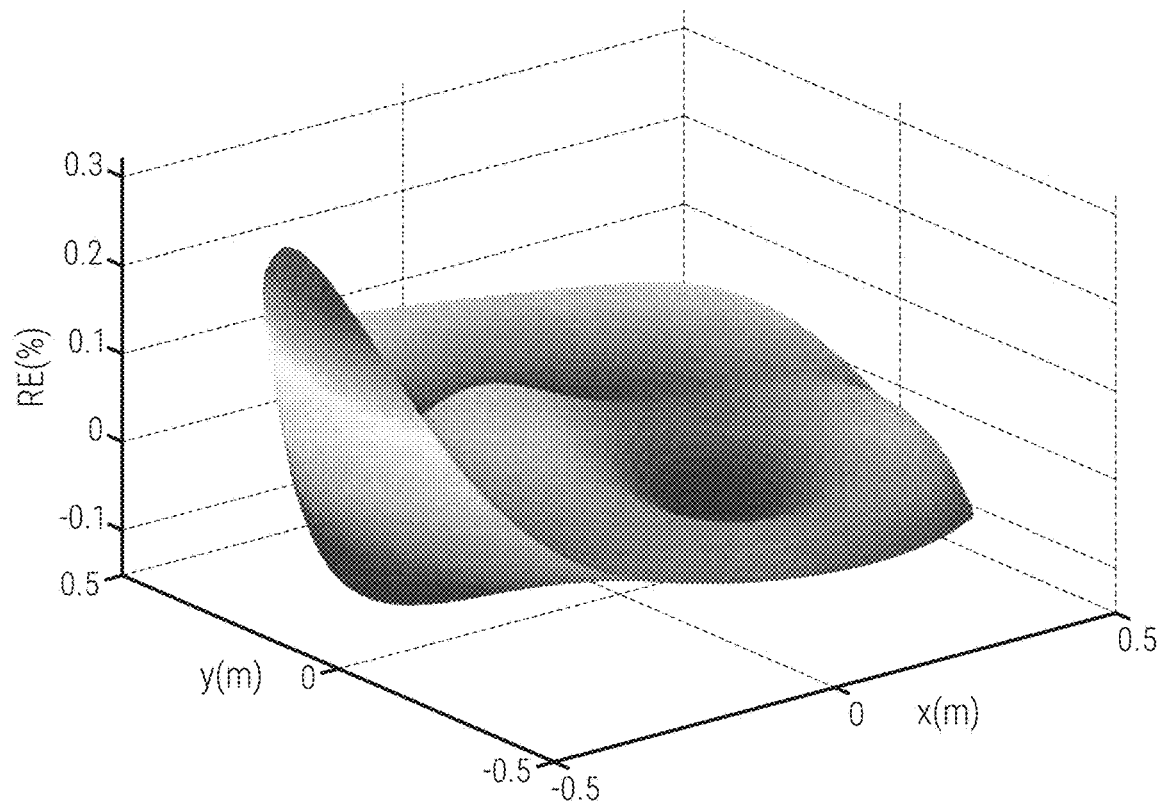
FIG. 9 shows the reconstruction relative errors of the axial velocity distribution in a flow field having a center deviated from a geometric round center, using 6 of acoustic wave sensors to simulate measurement in a round cross section pipe with 4 order fitting precision by Taylor series expansion.

Based on the method 100 to measure the axial velocity distribution and flow rate, and using a precision fitting of 3 order (Formula (2)) and 4 order of Taylor series, respectively, to calculate the axial velocity distribution u(x,y), the reconstructed flow field result u(x,y) with the acoustic simulation measurement using method 100 is obtained. The reconstruction errors are given in FIGS. 8 and 9, respectively. As can be seen in FIG. 8, the relative error of the reconstructed u(x,y) using the method 100 (3 order of Taylor series) to the preset simulation axial velocity field is approximately in a range of −1.5924 to 0.7029. As can be seen in FIG. 9, the relative error of the reconstructed u(x,y) using the method 100 (4 order of Taylor series) to the preset simulation axial velocity field is approximately in a range of −0.1030 to 0.3008.

Again, it can be seen that the simulated acoustic measurement is sufficiently accurate and reliable. And when the fitting precision with Taylor series expansion is increased, the simulated measurement precision by the acoustic measurement is increased correspondingly. That is, the precision of acoustic measurement is affected by the fitting order/precision of Taylor series expansion.

Figure 10:
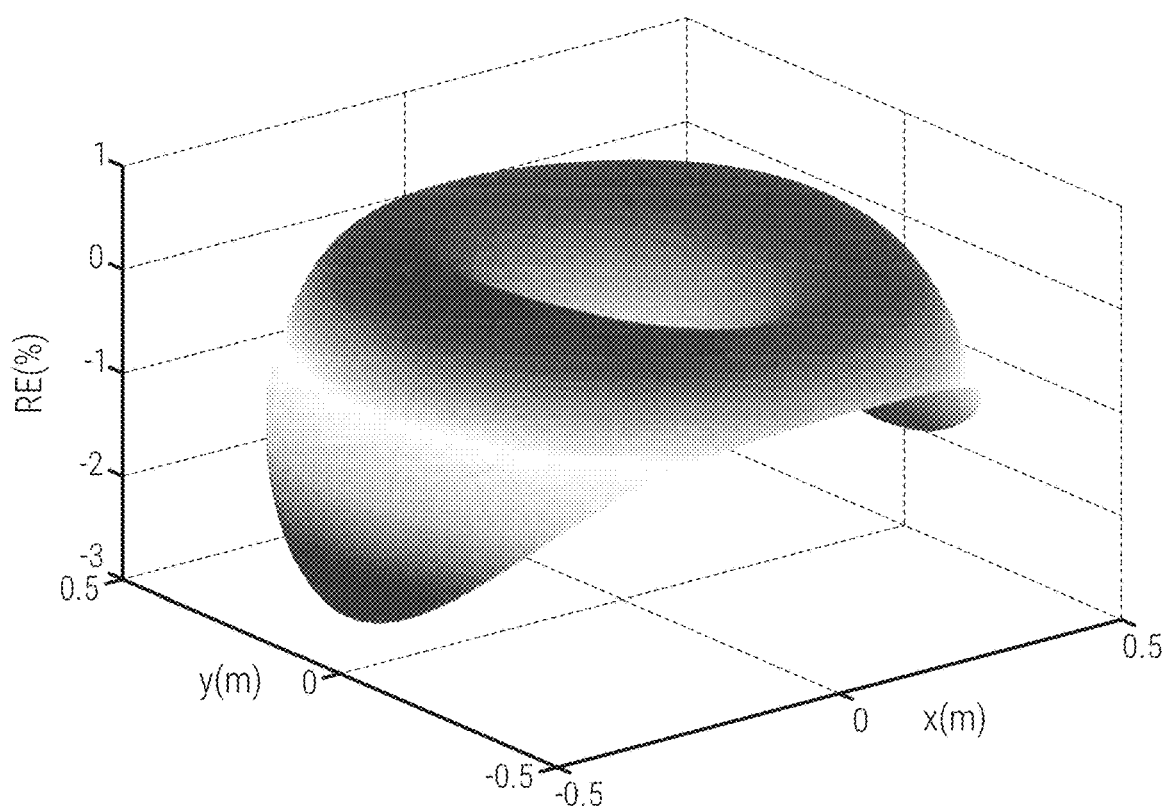
FIG. 10 shows the reconstruction relative errors of the axial velocity distribution in a flow field having a center at a geometric round center, using 8 acoustic wave sensors to simulate measurement in a round cross section pipe with 3 order fitting precision by Taylor series expansion.

To further determine the influence factors to the precision of the acoustic measurement, the simulated acoustic measurements in a round cross section of a pipe was conducted with eight (8) acoustic wave sensors. The preset axial velocity distribution in pipe is determined using the formula (5). That is, the simulated flow field is built with the flow center deviating from the geometric center in a round cross section of a pipe, and a center of the round cross section is used as an origin of a coordinate. Taylor series expansion fitting precision of 3 order and Taylor series expansion fitting precision 4 order are used for reconstruction. The relative reconstruction errors of the axial velocity distribution for the acoustic measurement using Taylor series expansion fitting precision of 3 order is illustrated in FIG. 1. As can be seen in FIG. 10 for fitting with 3 order of Taylor series, the relative error of the reconstructed u(x,y) using_the method 100 to the preset simulation axial velocity field is approximately in a range of −2.4172 to 0.5419.

Figure 11:
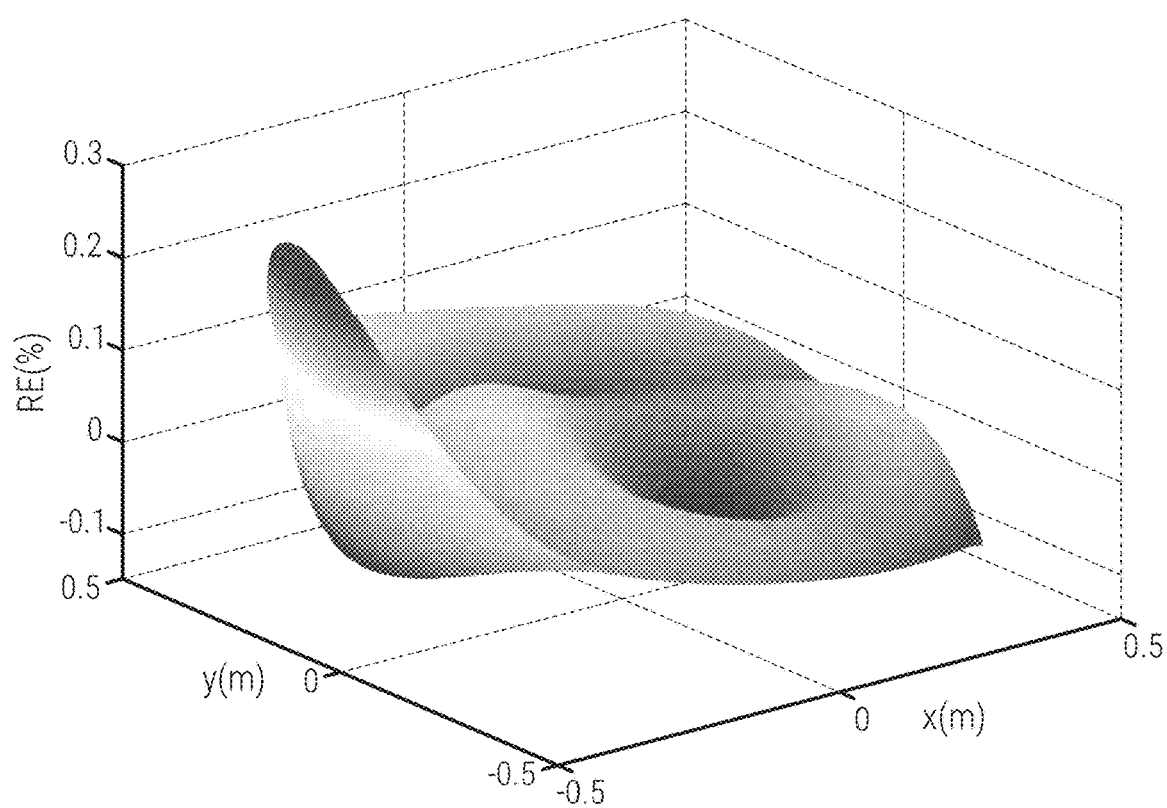
FIG. 11 shows the reconstruction relative errors of the axial velocity distribution in a flow field having a center deviated from a geometric round center, using 8 groups of acoustic wave sensors to simulate measurement in a round cross section pipe with 4 order fitting precision by Taylor series expansion.

The relative reconstruction errors of the axial velocity distribution for the acoustic measurement using Taylor series expansion fitting precision of 4 order is illustrated in FIG. 11. As can be seen in FIG. 11 for fitting with 4 order of Taylor series, the relative error of the reconstructed u(x,y) using the method 100 to the preset simulation axial velocity field is approximately in a range of −0.119 to 0.2895.

As it can be seen, the precision of the acoustic wave measurement is influenced by the fitting order/precision with Taylor series expansion. The use of eight of acoustic wave sensors does not show significant improvement to the simulated measurement results compared with using 6 of acoustic wave sensors.

The above two typical exemplary scenarios of simulated acoustic measurements of the axial velocity distribution show that the acoustic measurement of axial velocity distribution in a pipe is feasible and also reliable, and the acoustic measurement is based on the mechanism of sound wave path bending caused by a flow perpendicular or having angle to the sound propagation direction. Further, the precision of the acoustic measurement is affected by the precision of order of fitting series and irrelevant to the number of acoustic wave sensors used when a certain precision/accuracy has been achieved. In other words, when the number of the acoustic wave sensors is greater than a certain number, the effect of the number of the acoustic wave sensors to the measurement accuracy is small. Such a certain number is determined by the complexity of the spatial variation of the axial flow field, with a larger value for a more complex axial flow field. Nevertheless, as the fitting order/precision of series is increased, the number of acoustic wave sensors needs to be increased correspondingly to solve the equation because of the increase of number of coefficients needed in the fitting formula for the axial velocity distribution.

According to another aspect, the present disclosure provides a system 20 for acoustic measurement of the axial velocity distribution and the flow rate in a pipe 30 or a vessel. Referring to FIG. 12, the system 20 comprises a plurality of acoustic wave sensors 22 installed on the peripheral wall 26 of a measured cross-section 24 in the pipe 30, a digital to analog converter card (AD card) 40, an analog to digital converter card (DA card) 50, and a measuring computer 60. The measuring computer 60 includes a preset measurement software to measure the axial velocity distribution and the flow rate as described above. For example, the measuring computer 60 may include one or more processor, a memory and a plurality of instructions stored in the memory executable by the one or more processor to implement one or more steps of the method 100 or the routines to determine the axial velocity distribution and flowrate in the pipe or the vessel.

The digital to analog converter card 40 is connected with the measuring computer 60 and the plurality of the acoustic wave sensors 22, respectively, to transfer the digital signals coded with the measurement software or controlled by the one or more processors into analogue acoustic signals to be emitted by the acoustic wave sensors 22.

The analog to digital converter card 50 is connected with the measuring computer 60 and the acoustic wave sensors 22, respectively, to transfer the collected acoustic signals into digital signals and input into the measuring computer 60.

The measuring computer 60 controls, via the measurement software or the one or processors and the memory, the acoustic wave sensors 22 to emit sound waves and measure the sound wave travelling time on the sound wave paths from each acoustic wave sensor 22 to all other acoustic wave sensors 22, and substitute the sound wave travelling times obtained from the acoustic wave sensors 22 into a reconstruction formula for the axial velocity distribution to obtain the axial velocity distribution. In some embodiments, the reconstruction formula (1) for an axial velocity distribution in a pipe or a vessel is used to obtain the axial flow distribution u(x,y):

$$\int_{l_i} u(x, y)\sqrt{1 + (y')^2}\, dx = L_i\sqrt{c^2 - \left(\frac{L_i}{\Delta t_i}\right)^2},\, i = 1, 2, \cdots, N \quad (1)$$

wherein, $I_i$ is the ith sound wave path, y' is dy/dx, $L_i$ is a distance between the two acoustic sensors at the two ends of the ith path, $\Delta t_i$ is the average of the two sound wave travelling times of the sound waves along the ith sound path in opposite directions, N is the number of effective wave sound paths, c is the static sound speed at the measuring medium in the pipe or the vessel at the measuring conditions.

The measuring computer, via the preset measuring software or one or more processors and memory, integrates the obtained axial velocity distribution u(x,y) along the cross-section, so that the flow rate is obtained.

The method and system of the present disclosure are suitable to different media in a pipe, such as gas, liquid, two-phase or multiphase media for effective measurements to the axial velocity distribution and the flow rate in the pipe. Furthermore, the method and system of the present disclosure can be used to measure flow fields in a combustion chamber, a fluidized bed, a chemical reactor, and an open jet flow, etc.

SELECTED EMBODIMENTS AND CLAIM CONCEPTS

This section describes additional aspects and features of the method and system to determine the axial velocity distribution and flow rate presented without limitation as a series of paragraphs, some or all of which may be alphanumerically designated for clarity and efficiency, Each of these paragraphs can be combined with one or more other paragraphs, and/or with disclosure from elsewhere in this application, in any suitable manner. Some of the paragraphs below may expressly refer to and further limit other paragraphs, providing without limitation examples of some of the suitable combinations.

A0. A method to measure an axial velocity distribution and a flow rate in a pipe, characterized, comprising:

selecting a single cross-section located at a stable-flow segment or an interested segment in the pipe or a vessel, installing a plurality of acoustic wave sensors along a peripheral wall of the pipe or the vessel at the cross-section, wherein a plurality of effective sound wave paths are formed between the acoustic wave sensors and only one sound wave path is counted as an effective sound wave path between one pair of the acoustic wave sensors;

measuring a sound wave travelling time along each sound wave path, and substituting the sound wave traveling time into the following equation so as to reconstruct the axial velocity distribution u(x,y) on the cross section of the pipe or the vessel;

$$\int_{l_i} u(x, y)\sqrt{1 + (y')^2}\, dx = L_i\sqrt{c^2 - \left(\frac{L_i}{\Delta t_i}\right)^2},\, i = 1, 2, \cdots, N$$

wherein, $I_i$ is an ith sound wave path, $L_i$ is a distance between the two acoustic wave sensors at two ends of an ith sound wave path, $\Delta t_i$ is the sound traveling time along the ith sound wave path, N is a number of effective sound wave paths, c is a sound speed at measuring physical conditions of a medium;

integrating the axial velocity distribution u(x,y) obtained from the above step along the cross-section to obtain flow rate in the pipe.

A1. The method of paragraph A0, wherein measuring a sound wave travelling time along each sound wave path including measuring sound wave travelling times along each sound wave path in opposite directions, respectively and an average of the sound travelling times along the each sound wave path in opposite directions is a sound wave travelling time in an effective sound wave path.

A2. The method of any one of paragraph A0 to A1, wherein each acoustic wave sensor emits sound waves in turn, and when one acoustic wave sensor emits a sound wave, the rest of the acoustic wave sensors record the sound wave and wherein all of the acoustic wave sensors emit sound waves with the same frequency.

A3. The method of any one of paragraph A0 to A1, wherein every two to three acoustic wave sensors emit sound waves simultaneously with different frequencies for each, and wherein the sound waves are identifiable by filtering.

A4. The method of any one of paragraph A0 to A1 wherein the acoustic wave sensor has an integrated function of both emitting sound wave and receiving acoustic signals.

A5. The method of any one of paragraph A0 to A1, wherein the acoustic wave sensor is a combination of a sound wave emitter and a sound wave receiver.

A6. The method of any one of paragraph A0 to A1, wherein the axial velocity distribution u(x,y) is calculated by fitting with a polynomial of Taylor series expansion.

A7. The method of any one of paragraph A0 to A1, wherein, when the axial velocity distribution is characterized as a free jet flow, the axial velocity distribution along the cross-section is calculated with proximate fitting:

$$u(x,y) = Ue^{-\frac{(x-x_0)^2+(y-y_0)^2}{2\sigma^2}} + u_0$$

where $(x_0, y_0)$ are coordinates of a point of a maximum velocity, U is the maximum velocity magnitude of the jet, $u_0$ is a velocity at a far edge of the jet flow, and $\sigma$ is an expansion width.

A8. The method of any one of paragraph A0 to A1, wherein the measured cross-section in the pipe is perpendicular or approximately perpendicular to an axis of the pipe.

B0. A system based on one of paragraph A0 to paragraph A8, the system comprises: several acoustic wave sensors installed on a peripheral wall around a measured cross-section in a pipe or a vessel, a digital to analog conversion card, an analog to digital conversion card, and a measuring computer for measurement; a measuring software is preset in the measuring computer including a measurement software to measure an axial velocity distribution in the pipe, and the flow rate according to the previous described method;

the digital to analog conversion card is connected to the measuring computer and the acoustic wave sensors, respectively to transfer the digital acoustic signal, coded by the measurement software to analogue acoustic signals, and emits by acoustic wave sensors;

the analog to digital card is, connected to the acoustic wave sensors and the measuring computer, respectively, to transfer the measurement acoustic signals collected by the acoustic wave sensors into digital signals, and input into the measuring computer; wherein via the measuring software, the measurement computer controls all acoustic wave sensors to emit sound waves, measures each sound wave travelling time in each sound wave path from one acoustic wave sensor to all the other acoustic wave sensors, and substitutes all sound wave traveling time along sound wave paths into a reconstruction formulas to reconstruct the axial velocity distribution u(x,y) along the cross-section in the pipe or vessel, $$\int_{l_i} u(x,y)\sqrt{1+(y')^2}\,dx = L_i\sqrt{c^2 - \left(\frac{L_i}{\Delta t_i}\right)^2}, i = 1, 2, \cdots, N$$

where, $I_i$ is an ith sound wave path, $L_i$ is a distance between two acoustic wave sensors at two ends of an ith path, $\Delta t_i$ is an average of two sound wave traveling time of along the ith sound wave path, N is the number of effective sound wave paths, c is the sound speed at a medium in the pipe at measuring physical conditions; and wherein the measuring software of the measurement computer integrates the axial velocity u(x,y) along the cross-section to obtain the flow rate in the pipe.

It should be noted that the above exemplary embodiments are used to describe the technical solutions of the present invention, and are not restricted to the exemplary embodiments. Although the invention is described in detail with reference to the preferred embodiments, the technicians in the related arts should understand that: the exemplary embodiments of the present invention can be modified or the technical characteristic can be substituted without depart from the spirit of the present invention, and which should be covered in the scope of the technical solutions of the present invention.

The invention claimed is:

1. A method of acoustic wave measurement of an axial velocity distribution u(x,y) and a flow rate in a pipe, comprising:

selecting a single cross-section located at a stable-flow segment in the pipe;

installing a plurality of acoustic wave sensors along a peripheral wall of the pipe at the cross-section, wherein a plurality of effective sound wave paths are formed between the acoustic wave sensors and only one sound wave path is counted as an effective sound wave path between one pair of the acoustic wave sensors;

measuring a sound wave travelling time along each sound wave path; and substituting the sound wave traveling time into a following equation so as to reconstruct the axial velocity distribution u(x,y) on the cross-section of the $$\int_{l_i} u(x,y)\sqrt{1+(y')^2}\,dx = L_i\sqrt{c^2 - \left(\frac{L_i}{\Delta t_i}\right)^2}, i = 1, 2, \cdots, N$$

wherein, $I_i$ denotes an ith sound wave path, y' is dy/dx, $L_i$ is a distance between the one pair of the acoustic wave sensors at two ends of an ith sound wave path, $\Delta t_i$ is the sound wave traveling time along the ith sound wave path, N is a number of effective sound wave paths, c is a sound speed at measuring physical conditions of a medium; and integrating the reconstructed axial velocity distribution u(x,y) over the cross-section of the pipe to obtain the flow rate in the pipe.

2. The method claim 1, wherein measuring the sound wave travelling time along each sound wave path includes measuring sound wave travelling times along each sound wave path in opposite directions, respectively and an average of the sound wave travelling times along the each sound wave path in opposite directions is a sound wave travelling time in an effective sound wave path.

3. The method of claim 1, wherein each acoustic wave sensor emits sound waves in turn, and when one acoustic wave sensor emits a sound wave, the rest of the acoustic wave sensors record the sound wave and wherein all of the acoustic wave sensors emit sound waves with the same frequency.

4. The method of claim 1, wherein every two to three acoustic wave sensors emit sound waves simultaneously with different frequencies for each, and wherein the sound waves are identifiable by filtering.

5. The method of claim 1, wherein the acoustic wave sensor has an integrated function of both emitting a sound wave and receiving acoustic signals.

6. The method of claim 1, wherein the acoustic wave sensor is a combination of a sound wave emitter and a sound wave receiver.

7. The method of claim 1, wherein the axial velocity distribution u(x,y) is fitted with a polynomial of Taylor series expansion.

8. The method of claim 1, wherein, when the axial velocity distribution u(x,y) is characterized as a free jet flow, the axial velocity distribution u(x,y) over the cross-section is calculated with proximate fitting below:

$$u(x, y) = Ue^{-\frac{(x-x_0)^2+(y-y_0)^2}{2\sigma^2}} + u_0$$

where $(x_0, y_0)$ is coordinates of a point of a maximum velocity, U is the maximum velocity of the free jet flow, $u_0$ is a velocity at a far edge of the free jet flow, and σ denotes an expansion width.

9. The method of claim 1, wherein the cross-section in the pipe is perpendicular or approximately perpendicular to an axis of the pipe.

10. A system to determine an axial velocity distribution u(x,y) and a flow rate in a pipe, comprising
a plurality of acoustic wave sensors disposed on a peripheral wall around a cross-section of the pipe to emit analogue acoustic signals and collect the analogue acoustic signals;
a digital to analog converter card;
an analog to digital converter card;
a measuring computer for measurement, wherein a measurement software is preset in the measuring computer to determine the axial velocity distribution u(x,y) and the flow rate in the pipe;
wherein the digital to analog converter card is connected to the measuring computer and the plurality of acoustic wave sensors, respectively to transform digital signals coded by the measurement software to the analogue acoustic signals, and the analogue acoustic signals are emitted by the acoustic wave sensors;
wherein the analog to digital converter card is connected to the plurality of acoustic wave sensors and the measuring computer, respectively, to transform the analogue acoustic signals collected by the plurality of acoustic wave sensors into the digital signals, and the digital signals are input into the measuring computer;
and wherein via the measurement software, the measuring computer controls the acoustic wave sensors to emit sound waves, measures a sound wave travelling time on each sound wave path from one acoustic wave sensor to all the other acoustic wave sensors, and substitutes all sound wave traveling times along the sound wave paths into a reconstruction formula below to reconstruct the axial velocity distribution u(x,y) over the cross-section in the pipe:

$$\int_{l_i} u(x, y)\sqrt{1 + (y')^2}\, dx = L_i \sqrt{c^2 - \left(\frac{L_i}{\Delta t_i}\right)^2},\; i = 1, 2, \cdots, N$$

where, $l_i$ is an ith sound wave path, y' is dy/dx, $L_i$ is a distance between two acoustic wave sensors at two ends of an ith sound wave path, $\Delta t_i$ is an average of two sound wave traveling times along the ith sound wave path in opposite directions, N is a number of effective sound wave paths, c is a sound speed at a medium in the pipe at measuring physical conditions; and
wherein the measurement software of the measuring computer integrates the reconstructed axial velocity u(x,y) over the cross-section of the pipe to obtain the flow rate in the pipe.

11. The system of claim 10, wherein the acoustic wave sensor has an integrated function of both emitting a sound wave and receiving acoustic signals.

* * * * *